United States Patent [19]

Parker

[11] Patent Number: 5,221,114
[45] Date of Patent: Jun. 22, 1993

[54] FLEXIBLE CONNECTOR TO AFFORD ADJUSTABILITY IN A LIQUID DELIVERY LINE

[76] Inventor: Frank M. Parker, 17525 Dorson La., Castro Valley, Calif. 94546

[21] Appl. No.: 731,517

[22] Filed: Jul. 7, 1991

Related U.S. Application Data

[63] Continuation-in-part of Ser. No. 368,641, Jun. 20, 1989, Pat. No. 5,039,011.

[51] Int. Cl.$^5$ .............................................. F16L 33/20
[52] U.S. Cl. ...................................... 285/255; 285/278
[58] Field of Search ................... 285/255, 258, 278; 239/DIG. 23, 206; 29/523

[56] References Cited

U.S. PATENT DOCUMENTS

| | | | |
|---|---|---|---|
| 1,140,417 | 5/1915 | Svenson | 285/255 |
| 1,519,096 | 12/1924 | Kraft | 285/255 X |
| 2,552,791 | 5/1951 | Johnson | 285/258 |
| 4,829,021 | 4/1989 | Binder | 239/DIG. 23 X |
| 4,893,848 | 1/1990 | Melcher | 285/258 |

FOREIGN PATENT DOCUMENTS

| | | | |
|---|---|---|---|
| 149232 | 12/1952 | Australia | 285/258 |
| 1089603 | 3/1955 | France | |
| 598714 | 8/1946 | United Kingdom | 285/255 |
| 279278 | 5/1965 | United Kingdom | 285/258 |

*Primary Examiner*—Gregory L. Huson
*Assistant Examiner*—Kevin P. Weldon
*Attorney, Agent, or Firm*—Julian Caplan

[57] ABSTRACT

A flexible connector is used to connect a source of liquid to a dispenser so that the position of the dispenser may be adjusted or the line leading to a fixed dispenser may be adjusted. A typical use is in connecting underground pipe to a sprinkler head, but the invention may be used in other installations. Examples are to provide a connector for a light-weight, non-kink garden hose; sewer pipe fittings and ABS drain pipe. A very flexible tubing, such as light vinyl tubing, is encased in a tough outer protective tubing, such as convoluted tubing. At either end is a fitting into which the flexible tubing fits. A bushing inside the fitting expands the end of the flexible tubing and thus retains it within the body of the fitting. The end of the protective fitting is received in a counterbore in an end of the fitting. The upper end of the fitting may be attached to a sprinkler head or other device and hence may be shaped with an internal thread, an external thread, or a smooth cylindrical shape for a slip fit. Various nipples, pipe fittings and sprinkler head bodies may be attached to the upper end of the body.

13 Claims, 5 Drawing Sheets

FLEXIBLE CONNECTOR TO AFFORD ADJUSTABILITY IN A LIQUID DELIVERY LINE

CROSS-REFERENCE TO RELATED APPLICATIONS

This application is a continuation-in-part of copending patent application Ser. No. 07/368,641, filed Jun. 20, 1989 now U.S. Pat. No. 5,039,011, issued Aug. 13, 1991. The subject matter of said application is incorporated herein by reference.

BACKGROUND OF THE INVENTION

1. Field of the Invention

This invention relates to a new and improved flexible connection to afford adjustability in a liquid delivery line. More particularly, the invention relates to a connection between a source such as a sprinkler water line and a delivery or discharge device such as a sprinkler head. The invention makes it possible to adjust the position of the sprinkler head relative to the water line in a wide variety of positions including different elevations without the use of multiple piping elements such as lengths of pipe and fittings such as elbows, T's and the like.

2. Description of Related Art

In the aforesaid patent application Ser. No. 07/368,641, the background of the invention is described in detail. Reference to such description of the prior art background is requested.

SUMMARY OF THE INVENTION

The invention comprises a combination of elements which include a flexible hose made of vinyl tubing or other suitable product characterized by absolute flexibility and dimensional stability. Alternatively, commercially available tubing reinforced with nylon or other fibers may be used, thereby reducing flexibility but increasing strength. The vinyl tubing is encased in a protective covering such as convoluted tubing manufactured by many sources, one such source being Truesdell Company of Auburn Hills, Mich. Such convoluted tubing may be made of various materials including nylon 6, nylon copolymer, polyethylene, polypropylene, and other thermoplastic materials. It will be understood that the flexible tubing and convoluted tubing mentioned are typical and other tubings may be used.

At at least one end of the length of hose and tubing is a fitting. The fitting has a hollow body with a bore dimensioned to receive one end of the hose. Internally the body is formed with a shoulder slightly larger than the hose. A bushing is inserted in the hollow body from the end opposite that through which the hose is inserted and this bushing is forced into the end of the hose, causing it to expand to a size larger than the shoulder. Hence, once the bushing is inserted, the hose cannot be withdrawn from the fitting.

Preferably the lower end of the fitting is formed with a counterbore to receive one end of the protective covering. To prevent the covering from escaping from the counterbore an internal barb may be formed in the counterbore to lock into the covering. The fitting is provided with suitable external or internal threads for attachment to a sprinkler head or the like. The opposite end of the hose is attached to the water line by means of a similar fitting or other means. Because the tubing is flexible and the protective convoluted tube prevents sharp bends which might otherwise kink or collapse the hose, the fitting may be moved to various locations and elevations to provide wide adjustability in the positioning of the sprinkler head.

Accordingly, among the advantages of the invention are the fact that it permits wide adjustability of the line. Furthermore, the flexible connector absorbs damage if the sprinkler head is displaced. The hose does not tend to kink and hence sharper turns may be accomplished. The labor in installation is reduced. After a passage of time, the sprinkler head may be repositioned if required.

One feature of the invention is that it deters theft of sprinkler heads. Because of the cost of the heads and the intrinsic value of the materials of which many such heads are made, theft is an important problem in sprinkler maintenance. In the present invention the sprinkler head is threaded into the body of the fitting. If a thief turns the sprinkler head, instead of the threads of the sprinkler unscrewing from the threads of the fitting, the fitting will turn about the flexible tubing and hence the head cannot be removed without digging down to the level of the fitting and holding the fitting with a wrench to prevent its turning.

It will be understood, of course, that the present invention has wider adaptation than in sprinkler installations. For example, the invention may be adapted to garden hose, since it provides a non-kink, lightweight structure. In addition, sewer pipe fittings and drainpipe may be designed in accordance with the invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
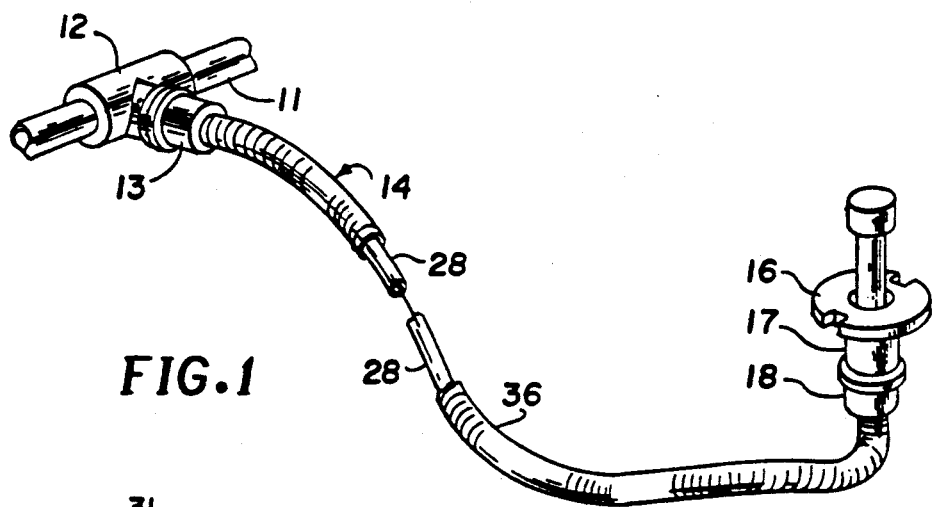
FIG. 1 is a schematic view partly broken away to reveal internal construction showing attachment of a sprinkler head to a water line in accordance with the present invention.

Directing attention to FIG. 1, there is shown a familiar sprinkler installation with which the present invention may be used, it being understood that the invention is adaptable to a wide variety of other installations. Water supply pipe 11 is provided with a T or other fitting to which is connected a fitting 13 in accordance with the present invention. At a distance from T 12 is a sprinkler head 16 which may be of any desired type. The head 16 has a depending stem 17 which is attached to fitting 18, also in accordance with the present invention. Flexible tubing 28 encased in convoluted tubing 36 interconnects fittings 13 and 18 in a manner which permits wide adjustability of head 16 relative to T 12.

Figure 2:
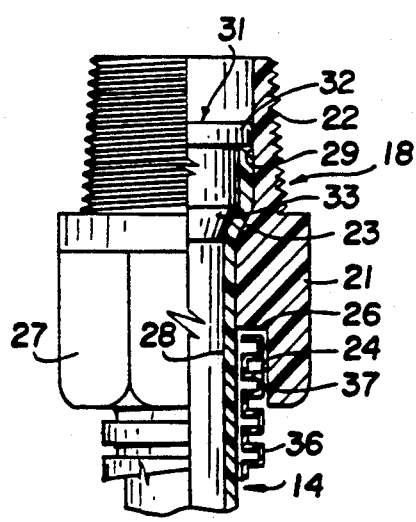
FIG. 2 is an enlarged side elevational view of a fitting of the present invention with the hose and convoluted tubing installed therein, the view being partly broken away in section to reveal internal construction.

FIG. 2 shows one form of fitting 18, it being understood that the fitting 13 may or may not be similar. Fitting 18 has a hollow body 21 and in the particular form shown in FIG. 2 has an externally threaded upper end 22. About midway of the length of the body 21 is an internal tapered shoulder 23. At the end of body 21 opposite end 22 is a counterbore 24 having a shoulder 26 at its inner end. The exterior of body 21 may be formed hexagonal as indicated by reference numeral 27 so that a wrench may be used to tighten the same to another component.

Interconnecting fitting 13 and fitting 18 is a flexible tubing 28 which, as has been stated, may be of polyvinylchloride with special plasticizers and without extenders or fillers so that it is highly flexible. The upper end 29 of flexible tubing 28 is inserted into the lower end of body 21 to a position above the tapered shoulder 26. A bushing 31 is inserted in the upper end 29 causing it to expand to a diameter greater than that of the taper 23. Bushing 31 has a cylindrical body having a collar 32 at its upper end so that the upper end of the tubing 28 may fit against the underside of collar 32. The end of bushing 31 opposite collar 32 is tapered as indicated by reference numeral 33 in order to facilitate insertion of the bushing into the end 29.

Surrounding the tubing 28 is a slightly shorter length of convoluted tubing 36 such as that manufactured by Truesdell Company of Auburn Hills, Mich. Such tubing has been conventionally used as a protection for wire harness, for other hoses and tubings, for air ducts, air drain tubes, swimming pool hoses and irrigation tubes, as well as for other purposes. It may be made of various materials including nylon 6, nylon copolymer, polyethylene, polypropylene and other thermoplastic materials. The function of convoluted tubing 36 is to protect the rather easily damaged flexible tubing 28 and also to prevent the latter from being bent sharply so that it would kink or collapse. Thus the convoluted tubing 36, being less flexible than the tubing 28, protects against improper installation as well as subsequent damage. The end 37 of tubing 36 is inserted through the counterbore 24 and abuts the shoulder 26.

Accordingly, in order to attach the combination, the end 29 of tubing 28 is inserted through the lower end of body 21 to a position adjacent but spaced downward from the upper end thereof. Thereupon the bushing 31 is forced into the end 29 causing it to expand to a diameter greater than that of the shoulder 23. When assembled, the tubing 28 is locked to the body 21. Meanwhile, the end 37 of convoluted tubing 36 enters the counterbore 24 and rests against the shoulder 26.

Redirecting attention to FIG. 1, if a thief were to attempt to turn the sprinkler head 16 to unscrew it from fitting 18, the body 21 would turn relative to the smooth, flexible tubing 29 and hence the stem 17 would not be unscrewed from the threaded upper end 22.

The aforesaid structure is subject to wide modifications. Directing attention now to the alternate construction shown in FIG. 2A, the tapered shoulder 23a is located lower within the body 21a so that the bushing 32a is below the threaded extension 22a. This construction permits use of a shorter body 21a.

Figure 3:
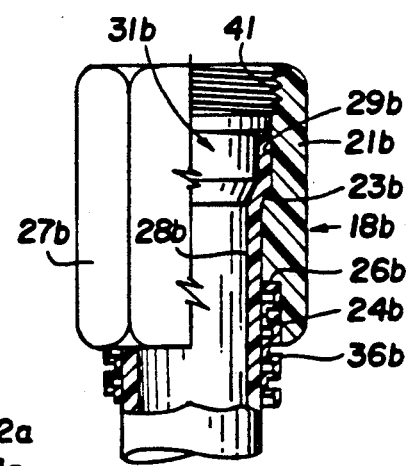
FIG. 3 is a view similar to FIG. 2 of a further modification.

FIG. 3 shows a fitting 18b similar to that of FIG. 2 except that, instead of external threads 22, the body 21b has internal threads 41.

Figure 2A:
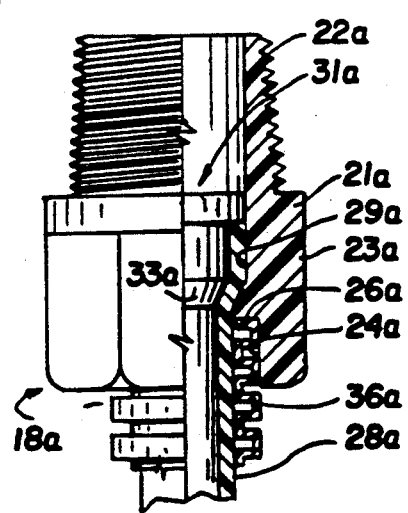
FIG. 2A is a view similar to FIG. 2 of a modification.
Figure 4:
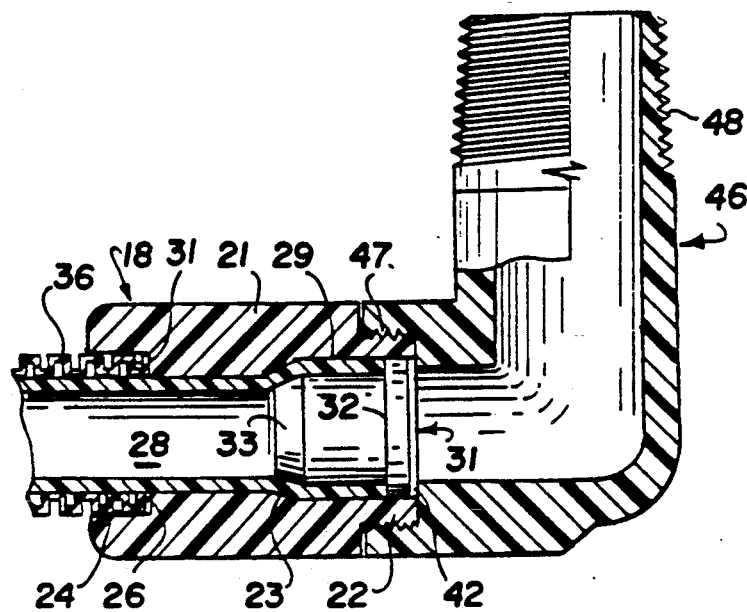
FIG. 4 shows the modification of FIG. 2 attached to an elbow.

FIG. 4 shows a fitting 18 such as shown in FIG. 2 or 2A attached to an elbow 46. One end of elbow 46 may be formed with internal threads 42 to mate with the threads 22 of fitting 18 while the opposite end of elbow 46 may be formed with external threads 48. It will be understood that the elbow 46 is merely illustrative of the various styles of pipe fittings which may be used in accordance with the present invention.

Figure 5:
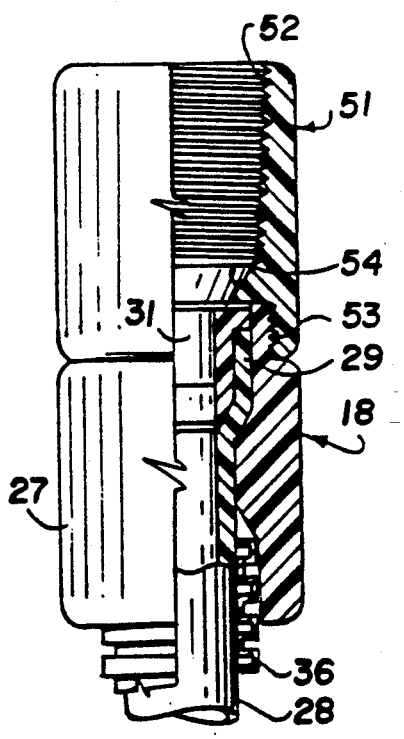
FIG. 5 shows a nipple attached to the fitting of the present invention.

FIG. 5 shows the use of a nipple 51 which may be used to convert the externally threaded body 18 to an internally threaded fitting. Thus the nipple 51 has internal threads 52 at its upper end as well as internal threads 53 at its lower end which mate with the threads 22 of fitting 18. Another feature of the structure of FIG. 5 is the use of a tapered shoulder 54 in the interior of nipple 51 which shoulder 54 engages the top of bushing 31 or, more precisely, the top of the collar 32 thereof. Such structure prevents the bushing 31 from disengaging the upper end 29 of the flexible tubing 28.

Figure 6:
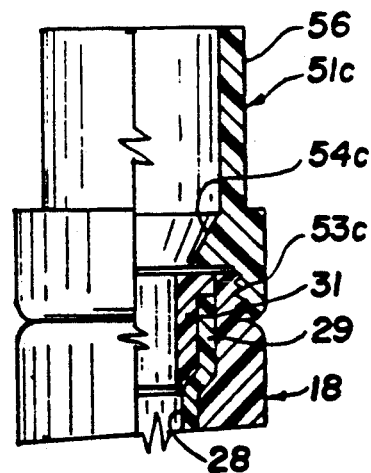
FIG. 6 is a view similar to FIG. 5 showing a different type of nipple.

In FIG. 6 the nipple 51, instead of being internally or externally threaded, is formed with a smooth slip-fit end 56 to which polyvinyl pipe may be installed by the use of pipe cement, as well understood in the sprinkler art.

Figure 7:
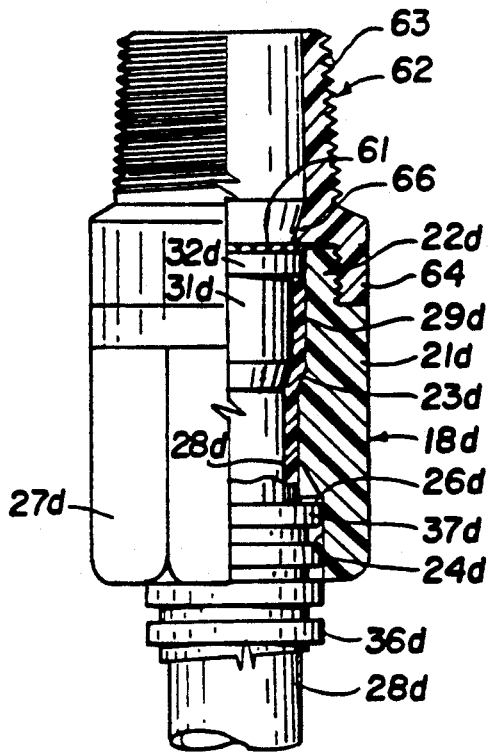
FIG. 7 is a view similar to FIG. 5 of a further modified nipple.

FIG. 7 shows a screen 61 installed above the collar 32d of bushing 31d to prevent dirt from passing through the fitting 18d. The screen may be integral with the bushing. In this modification the nipple 62 is formed with an externally threaded upper end 62 and an enlarged diameter internal thread 64 which engages the threads 22d of the fitting 18d.

Figure 8:
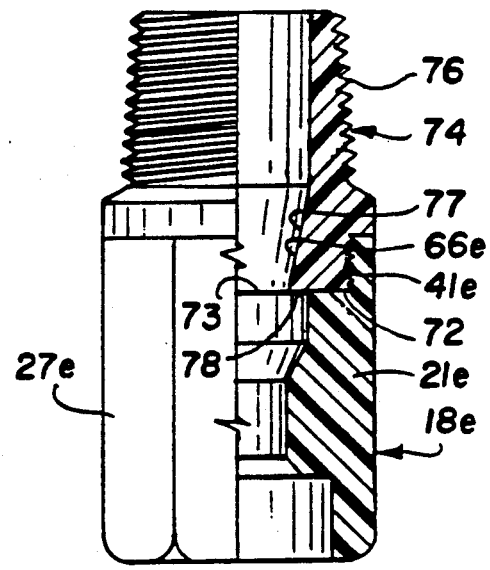
FIG. 8 is a sectional view of the fitting of FIG. 2 with the hose and convoluted tubing removed and with a further modified nipple attached.

Directing attention now to FIG. 8, in order to more clearly define the structure of the interior of fitting 18e, the tubing 28 and bushing 31, as well as the convoluted tubing 36 are omitted, but it will be understood that they would be installed in the fitting of FIG. 8 in the manner similar to the preceding modifications. Nipple 74 has an internally threaded end 71 which engages the internal threads 41e similar to the structure of FIG. 3. Shoulder 72 engages a similar shoulder 73 on body 21e. Nipple 74 is formed with an externally threaded upper end 76 and an externally threaded lower end 77. It will be understood that the structure of nipple 74 is subject to wide variation.

Figure 9:
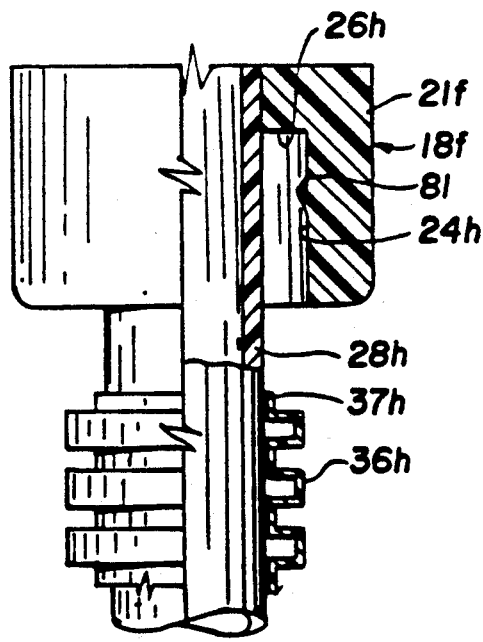
FIG. 9 is a fragmentary sectional view of a modification prior to assembly.
Figure 9A:
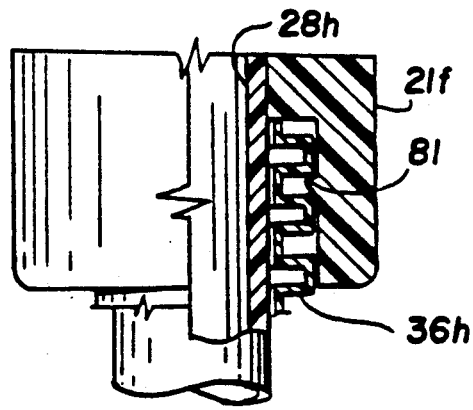
FIG. 9A is a view showing assembly of the structure of FIG. 9.

In some instances, especially when there is a relatively sharp angle applied to tubing 28 and convoluted tubing 36, there is a tendency for tubing 36 to be pulled out of counterbore 24. FIG. 9 shows a modification wherein radially spaced barbs 81 are formed projecting inward of the wall of counterbore 24f. Such barbs fit into the "valleys" of the convolutions of tubing 36f and tend to restrain escape of the end of tubing 36f from engagement with fitting 18f. FIG. 9 shows the parts prior to assembly and FIG. 9A after assembly.

Figure 10:
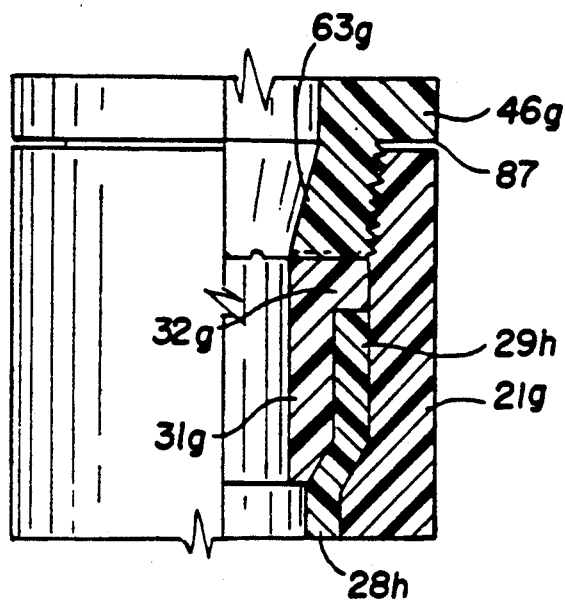
FIG. 10 is a view similar to FIG. 8 of another modification.
Figure 11:
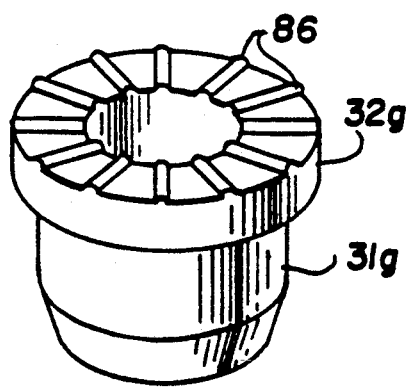
FIG. 11 is a perspective view of a bushing used in the modification of FIG. 10.

In describing the structure of this invention it has been stated that the sprinkler head may turn with the fitting 18 and body 21 turn relative to tubing 29, thereby discouraging theft of sprinkler heads. In many instances theft is not a serious problem. In order to discourage bushing 31g from escaping from the end of tubing 28g, the structure of FIG. 10 may be used. In this modification, the upper surface of collar 32g is formed with radial serrations 86. The elbow 46g (or any other fitting or sprinkler head stem) has matching serrations 87 on its lower end. The serrations 86, 87 inter-engage, to restrain the upper fitting 46 from unscrewing from the lower fitting 21h. Thus this modification overcomes any tendency for tubing 28g from escaping from fitting 18g.

Figure 12:
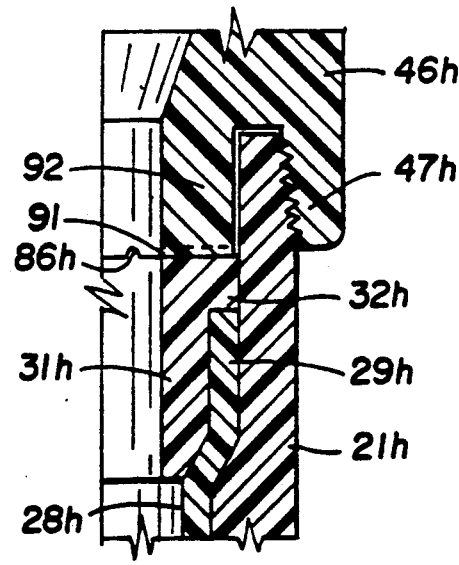
FIG. 12 is a fragmentary sectional view of another modification.

FIG. 12 shows a modification wherein body 21h is externally threaded. Fitting 46h has an elongated internal collar 92 formed at its end with serrations 91 which mate with serrations 86h on collar 32h of bushing 31h.

Figure 13:
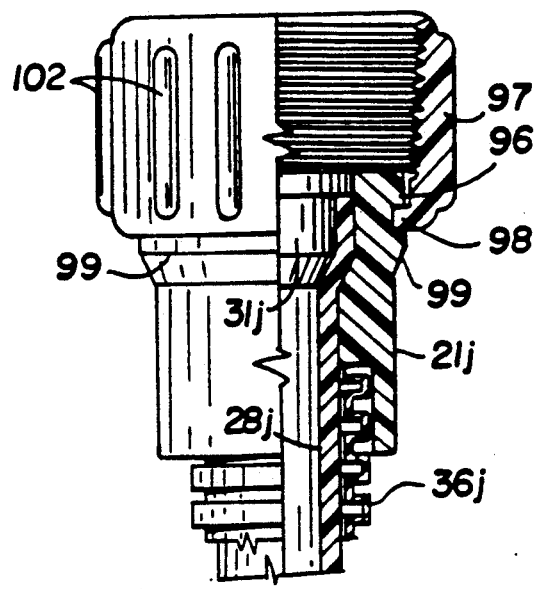
FIG. 13 is an elevational view partly broken away in section showing the invention applied to a female hose coupling.
Figure 14:
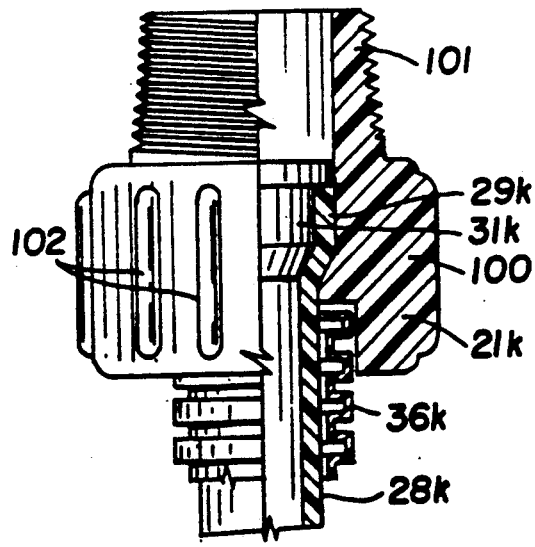
FIG. 14 is a view similar to FIG. 13 of a male hose coupling.

The present invention is not only adaptable to sprinkler systems but to other uses as well. In FIGS. 13 and 14 the invention is shown adapted to common hose couplings. In FIG. 13, body 21j has an external flange 96. Internally threaded hose coupling 97 has an internal flange 98 which fits under flange 96 so that coupling 97 can turn relative to fitting 18j. Protrusions 99 on body 21j engage flange 98 to maintain the elevation of coupling 97 above body 21j. Fluting 102 on the exterior of coupling 97 facilitates turning.

FIG. 14 shows body 21k in the shape of a male hose coupling having an externally threaded upper end 101 which mates with coupling 97. The exterior of body 21k is formed with the fluting 102 which may be gripped by the fingers or by a tool such as a wrench or pliers to turn body 21k relative to the upper end 29k of tubing 28k in order to screw the threads 101 into body 21j. In this modification, as in FIG. 2, the fitting 18k turns relative to the smooth tubing 28k.

Many of the elements of the modifications of FIGS. 2A, 3, 6, 7, 8, 9, 10, 12, 13 and 14 resemble those of the preceding modifications and the same reference numerals followed by the subscripts a, b, c, d, e, f, g, h, j and k, respectively, indicate corresponding parts.

In the above description and accompanying drawings the terms "up" and "down" have, for convenience in description, been used in the sense various elements appear in the accompanying drawings. It will be understood, of course, that elements may be inverted or turned at various angles relative to the vertical or to the plane of the drawings.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In combination, a flexible hose, an outer tube around said hose for a substantial portion of the length of said hose, and a fitting at least on a first end of said hose, said fitting comprising a unitary hollow body dimensioned to receive said first end of said hose, said body being formed with an internal first shoulder larger than said hose, said hose extending into said body beyond said shoulder, a bushing inserted in a first end of said fitting and inserted completely within said first end of said hose expanding said first end of said hose to a size larger than said first shoulder, whereby said hose cannot be pulled away from said fitting, said fitting extending outwardly beyond said bushing, said bushing being discrete from said body, said hose being rotatable relative to said fitting, said fitting being slidable over said hose in a direction away from said first end of said hose, said fitting being formed at a second end opposite said first end with a bore large enough to receive an end of said outer tube, an end of said outer tube being located within said bore, said outer tube being slidable over said hose in a direction away from said fitting and out of said bore.

2. The combination of claim 1 in which said bore is formed with an internal second shoulder, an end of said outer tube abutting said second shoulder.

3. The combination of claim 1 in which said bushing is formed with a central portion larger than the unexpanded inside diameter of said hose and a collar on the side of said central portion closest to said first end of said fitting, said first end of said hose abutting said collar, said first shoulder being tapered and the end of said bushing opposite said collar being formed with a taper complementary to said first shoulder.

4. The combination of claim 1 in which said fitting is formed with an external thread at said first end.

5. The combination of claim 1 in which said fitting is formed with an internal thread at said first end.

6. The combination of claim 1 in which said first-mentioned fitting is formed with threads at said first end and which further comprises a threaded coupling engaging said last-mentioned threads, the upper end of said bushing being formed with first serrations and the lower end of said second coupling being formed with second serrations mating with said first serrations to restrain turning of said first fitting relative to said coupling.

7. The combination of claim 6 in which said coupling is a nipple, the end of said nipple opposite said first-mentioned fitting being threaded.

8. The combination of claim 6 in which said coupling is a nipple, the end of said nipple opposite said first-mentioned fitting being formed with a smooth cylindrical surface to engage a pipe with a slip fit.

9. The combination of claim 8 which further comprises a round screen interposed between said second shoulder and said bushing.

10. The combination of claim 1 which further comprises an internally threaded hose coupling formed at the lower end of said coupling with an internal first flange and said body is formed at its upper end with an external second flange fitting over said first flange to retain said hose coupling and body together.

11. The combination of claim 10 which further comprises at least one external protuberance on said body immediately below said first flange to maintain said hose coupling elevated above said body.

12. The combination of claim 1 in which said body is shaped like an externally threaded hose coupling and is turnable relative to said hose and said bushing, said body having an upward extending externally threaded upper end and fluting on the exterior of said body to facilitate turning said body relative to said hose.

13. The combination of claim 1 in which said bushing is non-rotative relative to said hose and said hose is rotative relative to said body.

* * * * *